US006275679B1

(12) United States Patent
Elam et al.

(10) Patent No.: US 6,275,679 B1
(45) Date of Patent: Aug. 14, 2001

(54) SECURE COMMUNICATION USING ARRAY TRANSMITTER

(75) Inventors: Carl M. Elam, Ft. Washington, MD (US); Dale A. Leavy, Edwards AFB, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 06/788,617

(22) Filed: Jun. 24, 1985

(51) Int. Cl.$^7$ .............................. H04B 1/06; H03D 3/22; H01Q 3/22
(52) U.S. Cl. ........................ 455/26.1; 375/333; 342/373
(58) Field of Search ................................... 370/8, 10, 22; 455/26, 27, 26.1; 343/372, 377; 375/333, 361, 365; 342/372, 377

(56) References Cited

U.S. PATENT DOCUMENTS

| | | | |
|---|---|---|---|
| 3,478,359 | 11/1969 | Salmon | 343/100 |
| 3,646,558 | 2/1972 | Campanella | 343/100 SA |
| 3,697,994 | 10/1972 | O'Daniel | 343/16 R |
| 3,701,143 | * 10/1972 | Nacht | 370/22 X |
| 3,723,955 | 3/1973 | Lyons et al. | 340/5 R |
| 3,747,098 | 7/1973 | Kirkpatrick et al. | 343/16 R |
| 3,864,689 | 2/1975 | Young | 343/854 |
| 3,999,182 | 12/1976 | Moeller et al. | 343/100 SA |
| 4,034,374 | 7/1977 | Kruger | 343/16 R |
| 4,255,810 | * 3/1981 | Solomon et al. | 455/26 X |
| 4,445,119 | * 4/1984 | Works | 343/377 |

OTHER PUBLICATIONS

M.I. Skolnik, "Self–Phasing Array Antennas", IEEE Transactions on Antennas and Propagation, vol. AP–12, 1964, pp. 142–149.

Henning F. Harmuth, *Transmission of Information by Orthogonal Functions,* 2nd ed., New York/Heidelberg/Berlin: Springer–Verlag, 1972, pp. 1–13.

* cited by examiner

*Primary Examiner*—Mark Hellner
(74) *Attorney, Agent, or Firm*—Bernard E. Franz; Thomas L. Kundert

(57) ABSTRACT

The radio transmission circuit comprises 16 antenna elements in a broadside array. A carrier wave is routed to the 16 elements and the phase to each element is adjusted to direct the transmitted wavefront toward a selected receive point. Prior to transmission, however, the carrier to each element is independently modulated by a two-state (0/π) phase shifter. Each of the 16 carriers is modulated with the first 16 orthogonal Walsh waveforms (a digital counterpart of the Fourier Transform). The output power levels at all antennas are equal, only the phase of the RF carriers change. Depending upon the sign conditions (inverted or noninverted) for the various 16 modulation waveforms, a pulse position modulation (PPM) signal is transmitted in which the pulse can occupy one of 16 time positions. This PPM signal will be received clearly at the intended location, however, at other locations, approximately a degree or more to the side of the transmitted direction, the signal will become garbled due to the improper phase relation of the 16 signals arriving at those locations.

This circuit is unique in that signals transmitted by broad side array elements are modulated using two-state (0/π) phase shifters controlled by orthogonal Walsh elements. The Walsh elements are selectively inverted or noninverted in such a manner as to generate a PPM data signal along the intended direction of reception, and produce garbled data to receivers off the signal beam.

7 Claims, 6 Drawing Sheets

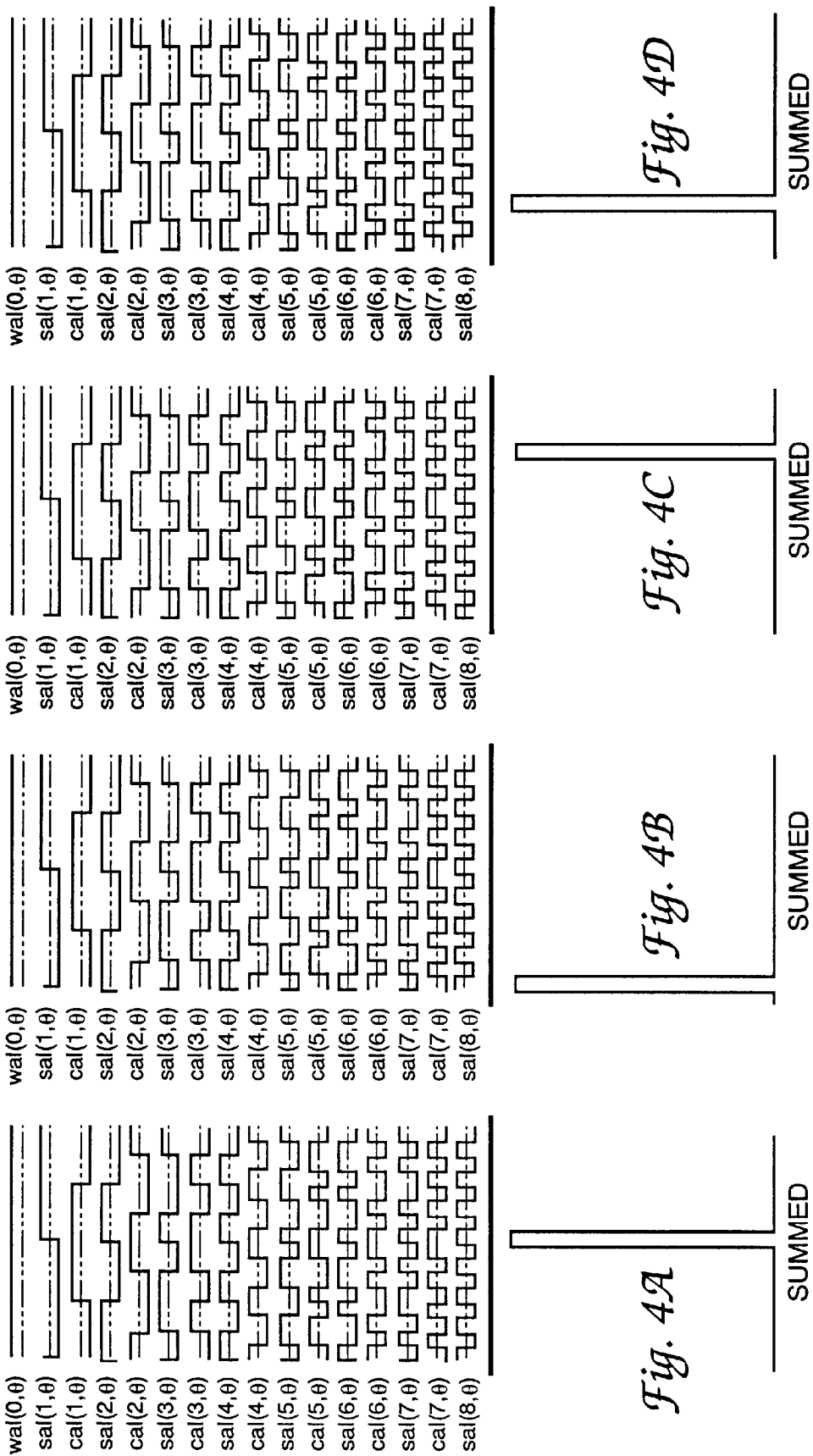

SECURE COMMUNICATION USING ARRAY TRANSMITTER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of communication with a secure data link using a transmitter with a phased antenna array.

There are many forms of secure data links for radio transmission using various types of coding. Although not directed to security, a book by Henning F. Harmuth, *Transmission of Information by Orthogonal Functions*, 2nd ed. New York/Heidelberg/Berlin:Springer-Verlag, 1972, is of interest.

Phased array antenna systems are also well known, as shown for example in the text by Skolnik, "Introduction to Radar Systems" 2nd ed. Chapter 8; or in the "Radar Handbook" edited by Skolnik, Chapter 11. U.S. Pat. No. 3,723,955 to Lyons et al discloses a sonar beam generating apparatus in which the generated beam is shifted between 0° and 180° by an array of transducer elements. U.S. Pat. No. 3,697,994 to O'Daniel discloses a digital computer system for steering the pencil beam of a 3-D cylindrical array radar antenna. The beam is steered in both elevation and azimuth by selectively energizing binary phase shifters associated with each radiating element of the array. U.S. Pat. Nos. 4,034,374; 3,646,558; 3,999,182; 3,747,098; 3,478,359; and 3,864,689 disclose a variety of antenna systems with phase shifters which are of general interest.

SUMMARY OF THE INVENTION

An object of the invention is to provide a secure data link, with a radio transmission circuit which permits radiating data signals which are discernible only along the intended path of reception and are unintelligible at other receive points.

The radio transmission circuit according to the invention comprises N antenna elements in a broadside array. A carrier wave is routed to the N elements and the phase to each element is adjusted to direct the transmitted wavefront toward a selected receive point. Prior to transmission, however, the carrier to each element is independently modulated by a two state (0/π) phase shifter. Each of the 16 carriers is modulated with the first 16 Orthogonal Walsh waveforms (a digital counterpart of the Fourier Transform). The output power levels at all antennas are equal, only the phase of the RF carriers change. Depending upon the sign conditions (inverted or noninverted), for the various 16 modulation waveforms, a pulse position modulation (PPM) signal results; the pulse can occupy one of 16 time positions. This PPM signal will be received clearly at the intended location, however, at other locations, approximately a degree or more to the side of the transmitted direction, the signal will become garbled due to the improper phase relation of the 16 signals arriving at those locations.

A feature of the system is that signals transmitted by broad side array elements which are modulated using two state (0/π) phase shifters controlled by orthogonal Walsh elements. The Walsh elements are selectively inverted or non-inverted in such a manner as to generate a PPM data signal along the intended direction of reception, and produce garbled data to receivers off the signal beam.

BRIEF DESCRIPTION OF THE DRAWINGS

FIGS. 4A–4C comprise a set of timing diagrams (hereinafter referred to collectively as FIG. 4) showing the PPM signals resulting from the modulation;

DETAILED DESCRIPTION

Figure 1:
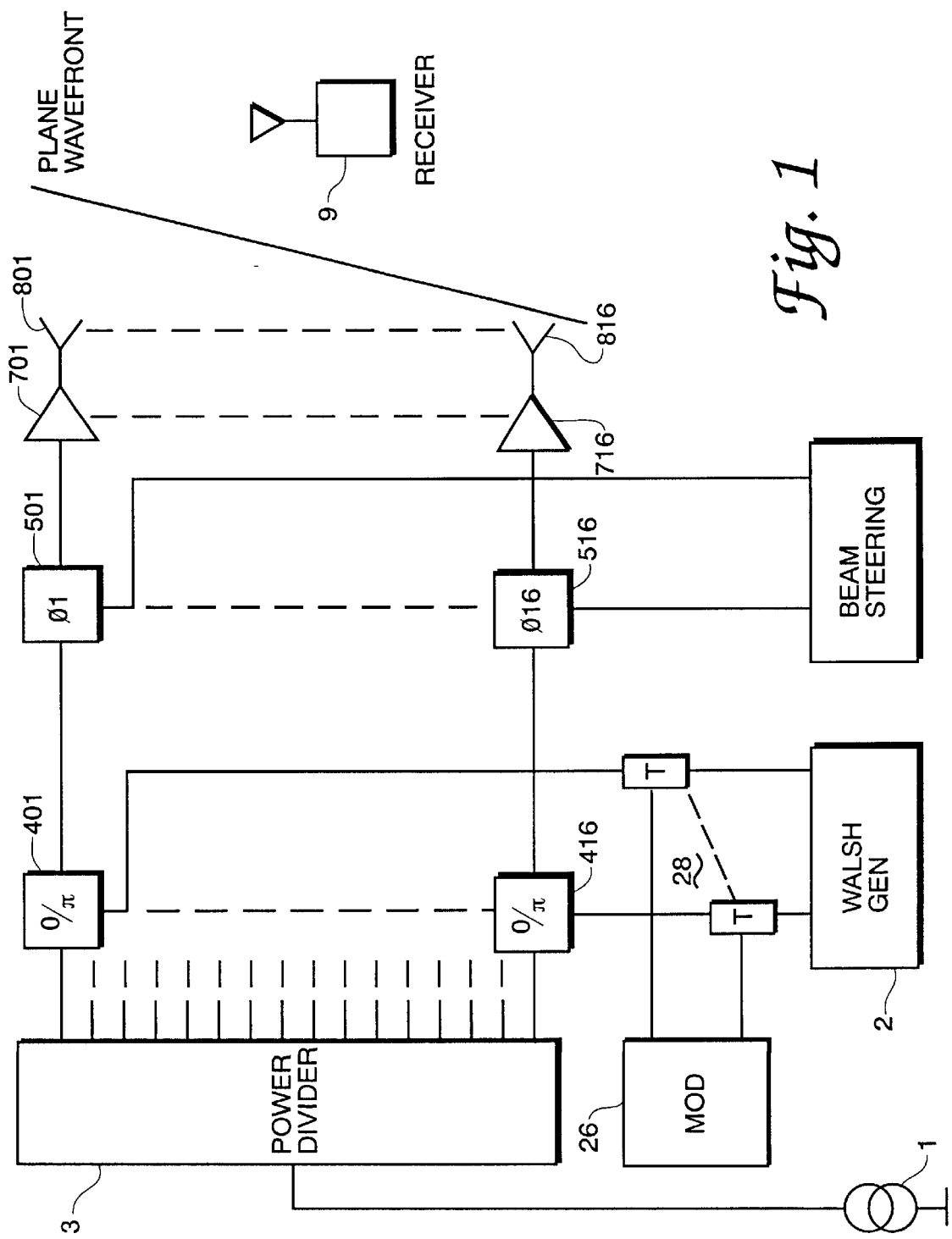
FIG. 1 is a block diagram of an orthogonally modulated PPM array transmitter.

FIG. 1 illustrates the basic configuration of a system using the invention. The circuit is a multichannel microwave transmitter network in which each channel obtains its signal from either a common RF generator or from a receiver. Each of the channels phase modulates its signal, then amplifies and radiates it from an antenna.

As shown in FIG. 1, a signal source 1 is a microwave generator which is tuned to the frequency of a receiver site 9. The signal source may alternately consist of a receiver with an antenna which is tuned to receive signals from the receiver site 9. A function generator 2 and modulator 26 provides signals for pulse position modulation.

A power divider 3 splits the signal from the source 1 and routes the divided signal into 16 output paths. The 16 output signals are equal in power.

Two-state phase shifters 401–416 are coupled to the outputs of the power divider 3, for changing the phase of the microwave signals. Each of these 16 phase shifters receives a digital control signal from a unit 2, to control the phase shift. Each of the phase shifters 401–416 is limited to two settings, 0° and 180° apart.

Variable phase shifters 501–516 are coupled to the outputs of the two-state phase shifters 401–416. The 16 variable phase shifters are utilized to steer a transmitted beam to precisely direct it toward the receiver site 9. A beam steering unit 6 supplies control signals to the variable phase shifters.

There are 16 power amplifiers 701–716 coupling the outputs of the variable phase shifters to 16 transmit antenna elements 801–816. The antenna elements are typically of the microwave horn type.

Figure 2:
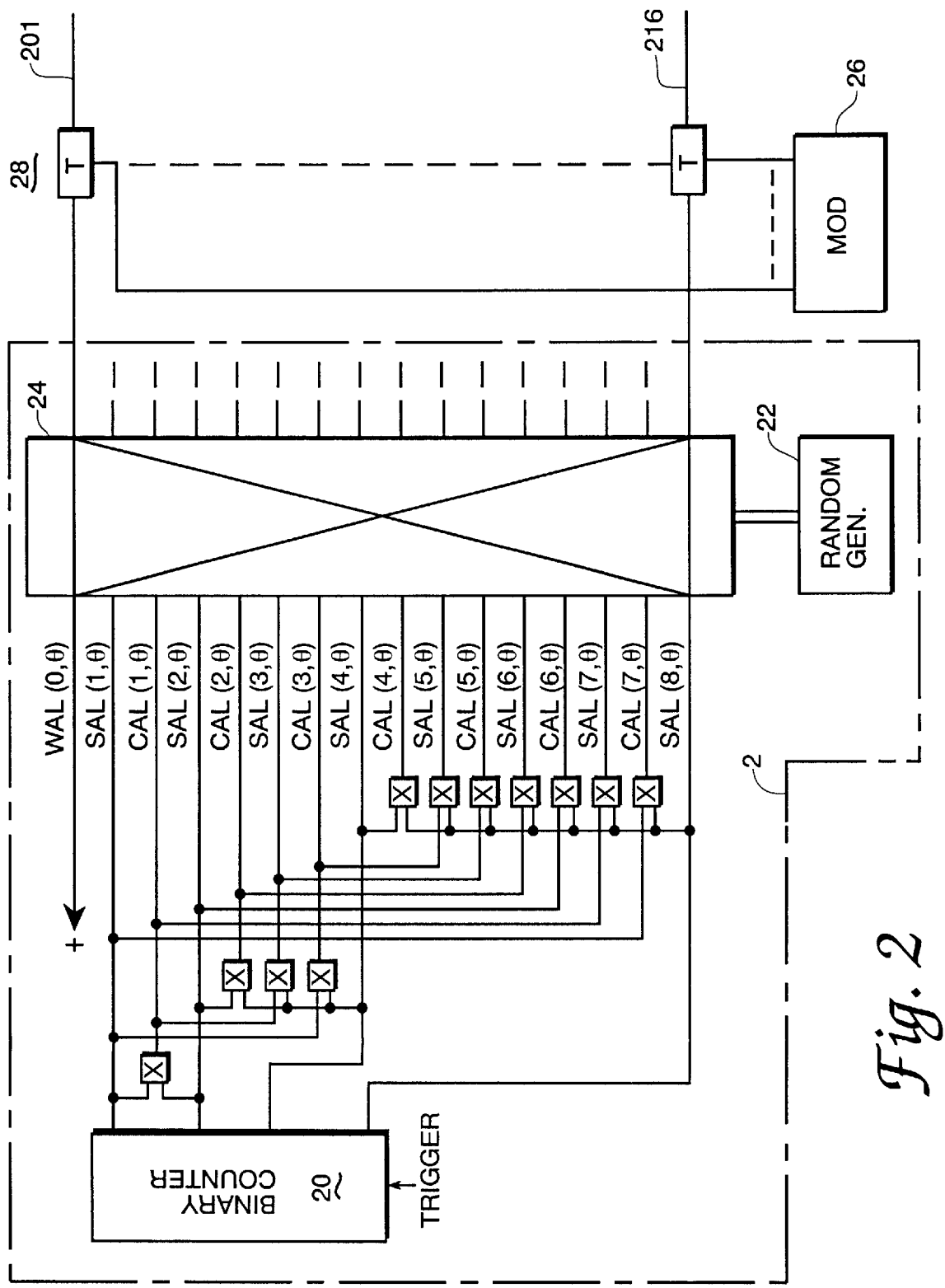
FIG. 2 is a functional block diagram of a Walsh generator.
Figure 3:
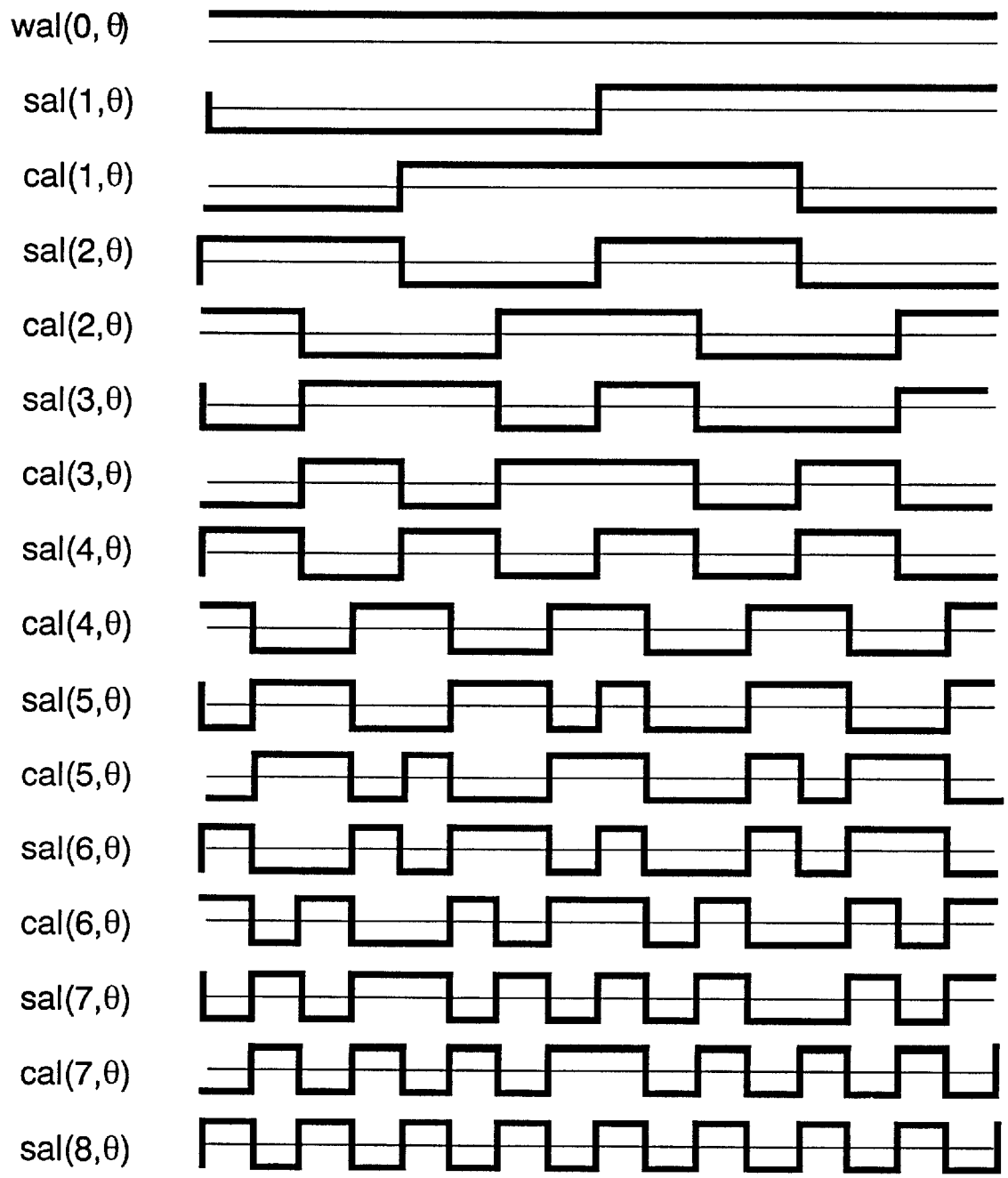
FIG. 3 is a timing diagram of a set of Walsh functions.

FIG. 2 is a functional block diagram of a Walsh function generator and modulator (blocks 2 and 26 of FIG. 1). FIG. 3 is a timing diagram illustrating 16 Walsh digital signals. Walsh functions and their use for transmission of information are discussed throughout the book by Harmuth. A four-stage binary counter 20, with an output from each stage, produces the four signals, Sal (1,θ), Sal (2,θ), Sal (4,θ), and Sal (8,θ). The four signals from the counter 20 may be combined in multipliers or half adders X to produce the other Sal and Cal Walsh functions up to Cal (7,θ). Wal (0,θ) is a continuously positive signal. Each function may be considered as a complete cycle with 16 pulse positions. FIG. 2 also shows a random generator 22 controlling a switching network 24, which, between each complete signal cycle, randomly reconnects each of the 16 Walsh input signals to the 16 output lines. A modulator 26 controls a set of 16 transmission gates 28 to couple the outputs of the switching network 24 to 16 output lines 201–216. These transmission gates selectively couple some of the signals directly while inverting others (this can be accomplished with EXCLUSIVE-OR gates for gates 28). The Walsh signals in FIGS. 3 and 4 are shown in a conventional mathematical form as plus and minus levels, but these can be thought of as high and low levels of logic circuits such as positive and ground for the 7400 TTL series.

Circuit Operation

A microwave signal enters the power divider 3 from either the RF signal generator 1 or a receiver. Which signal source is used will normally depend upon whether the receiver site 9 is radiating a signal which can be reused as a carrier by the transmitter array. If no carrier is available from the site 9 then the internal signal generator must be tuned to the desired frequency and connected to the power divider 3. In the preferred configuration the power divider output and subsequent circuit have 16 channels.

In the power divider 3 the input signal is equally divided into 16 parts and flows out into the 16 transmitter channels. After emerging from the power divider, each of the 16 signals pass through identical circuit channels, and each channel applies a unique signal modulation waveform upon the carrier.

Figure 5A:
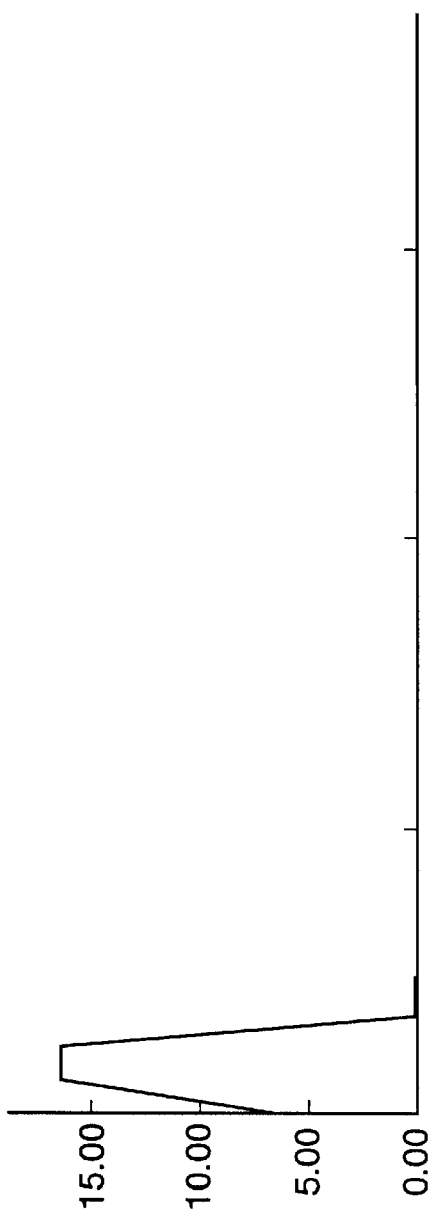
FIGS. 5A and 5B are time functions of a signal; 5A being for a signal received on beam, and for a signal received off beam near a null between the mainlobe and a first sidelobe.
Figure 5B:
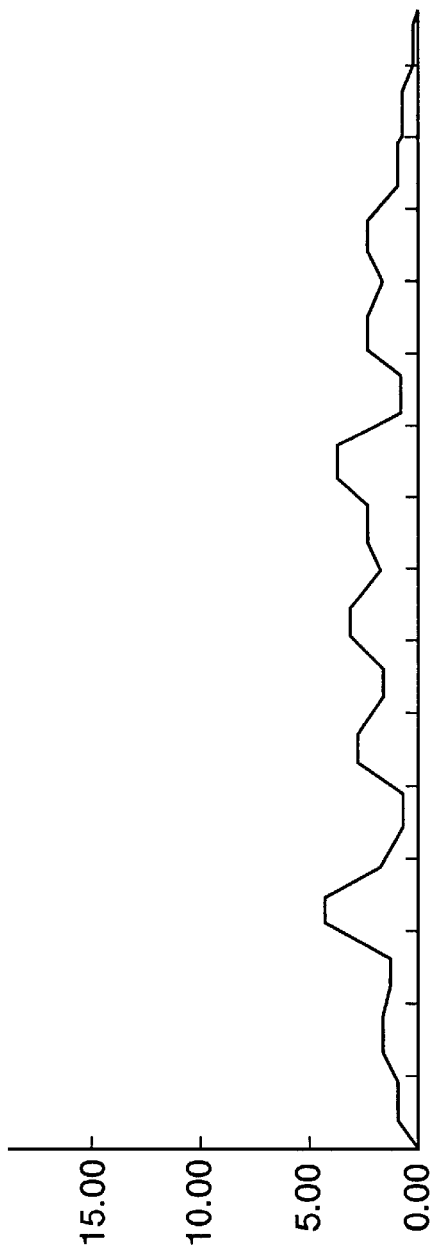

The signals after leaving the power divider enter the two state phase shifters. In the phase shifters each of the 16 signals is phase modulated. The modulation applied at each phase shifter consists of two phase conditions. One condition is zero degrees (0°) phase shift and the other is 180° phase shift. The digital signals which govern the condition of each phase shifter are different for each of the 16 channels. FIG. 3 illustrates typical waveforms for each channel. Typically when the waveform is low (−1) a phase shifter will be set to 0° and when the waveform is high (+1) the phase shifter will be set to 180°. This choice is arbitrary and may be reversed. The signals from the power divider 3 entering the two-state phase shifters should be in phase with each other. The 16 digital modulation control signals are produced by the Walsh Function Generator 2. Normally the generator will produce several complete signal cycles of the waveform with each conveying one PPM pulse. FIG. 4 illustrates how typical PPM signals are produced by adding and subtracting the waveforms. The reader will notice in FIG. 4 that the pulse can occupy any one of 16 time slots or positions. The position is determined by changing the sign of various Walsh bit streams as illustrated. Each time a new signal cycle is started, the Walsh Function Generator will randomly or pseudo-randomly reassign the modulation sequences to different channels. This will minimize reception by receivers off the beam of transmission, but will not affect reception of the PPM signal along the beam of transmission and thus at the receiver site (9). FIG. 5 illustrates a typical PPM signal as received on the beam and off the beam.

After undergoing phase modulation, the 16 signals are routed to the variable phase shifters 501–516. These devices in conjunction with the beam steering control unit 6 adjust the phases of the signals to direct or point the radiated wavefront in the desired direction. Upon leaving the phase shifters the 16 signals enter the power amplifiers 701–716 which increase the signal to a desired level. After amplification the signals are routed to the antenna elements 801–816 for radiation.

From the power divider 3 to the antenna elements the system should be fabricated such that the signal phase shifts are equal in all channels, except for the intentional phase shifts introduced by the phase shifters 401–416 and 501–516.

Figure 6:
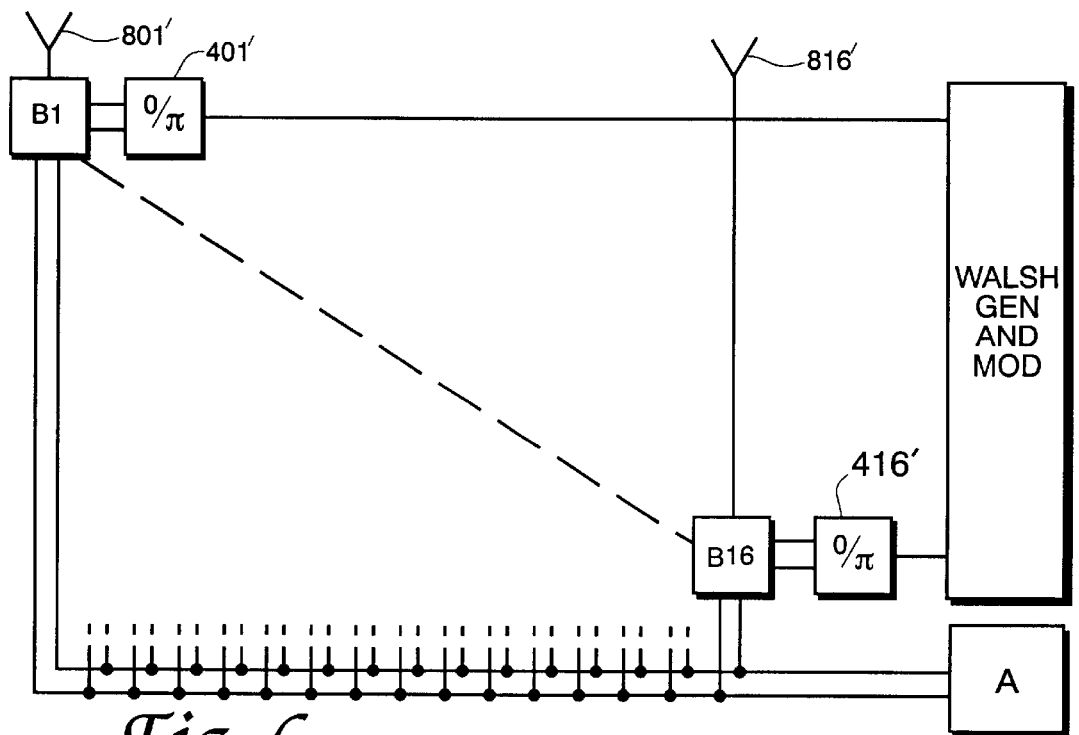
FIG. 6 is a block diagram of a system using beam steering with phase conjugate amplifiers.

An alternate configuration for this invention is illustrated in FIG. 6. This configuration requires that the receiver site 9 transmit a signal for use as a carrier by the system. The circuit channels in this configuration use self-phasing (phase conjugate) techniques to redirect or point the beam toward the receiver site 9. The details of this concept are described in Skolnik and King, "Self Phasing Arrays", IEEE Transactions on Antennas and Propagation, Vol. AP-12, pp. 142–149 (1964). Also in the same issue, pages 150–154, see Sichelstiel et al, "Self-Focusing Array Research Model".

Figure 6A:
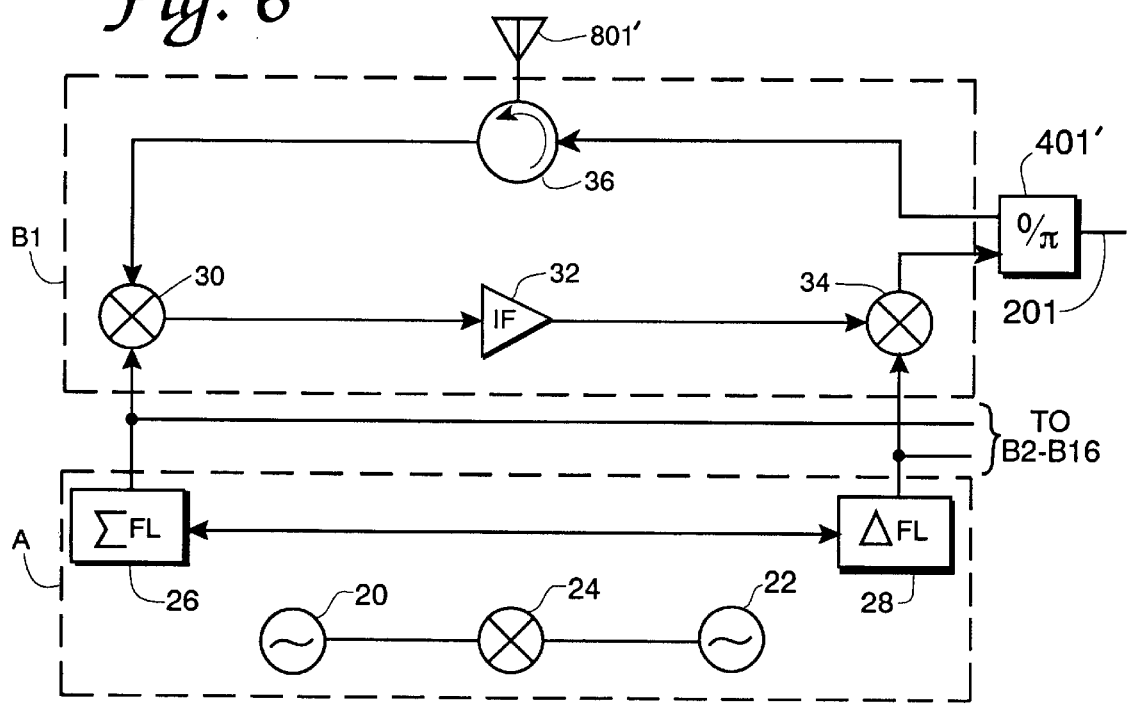
FIG. 6A is a functional block diagram of phase conjugate amplifiers represented in FIG. 6 as blocks A and B.

FIG. 6A is a functional block diagram of a phase conjugate amplifier represented in FIG. 6 as a single unit A, coupled to 16 units B1–B16, which are coupled to the 16 phase shifters 401'–416'. Unit A comprises a $\sin \omega_S t$ generator 20, and a $\sin \omega_{IF} t$ generator 22, each coupled to inputs of a mixer 24. The output of mixer 24 is coupled to two filters, a sum filter 26 and a difference filter 28, which are tuned respectively to the sum and the difference of the frequencies of the two generators 20 and 22. The outputs of the two filters are also the outputs of unit A which are coupled to the inputs of the 16 units B1–B16. The signal at the output of filter 26 is $\cos(\omega_S + \omega_{IF})t$, and the signal at the output of filter 28 is $\cos(\omega_S - \omega_{IF})t$.

Each unit B1–B16 comprises two mixers 30 and 34, an IF amplifier 32, and a circulator 36. The outputs from unit A are coupled to inputs of the two mixers. The IF amplifier 32 is coupled between the output of mixer 30 and an input of mixer 34. The circulator 36 has an output to mixer 30, an input from mixer 34 (via a phase shifter), and a two-way connection to an antenna element. The signal from mixer 30 to the IF amplifier 32 is $\sin(\omega_{IF} t - \phi)$. The signal from circulator 36 to mixer 30 is $\sin(\omega_S t + \phi)$, and the signal from mixer 34 is $\sin(\omega_S t - \phi)$.

Note that the phase conjugate transmitter may double the frequency of the received carrier and still retain proper retro-directivity. Use of this feature, where the transmitted and received signals are widely separated, will minimize the self interference between transmitted and received signals.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Wherein said phase shift means in each of the N channels comprises a two-state phase shifter and a variable phase shifter in tandem, said function means being coupled to the two-state phase shifter of all N channels, and said beam steering control means being coupled to the variable phase shifter of all N channels.

2. Apparatus as set forth in claim 1, wherein said functions produced by said function means comprise N Walsh functions from wal (0,θ), sal (1,θ), cal (1,θ), sal (2,θ) to sal (N/2,θ).

3. Apparatus as set forth in claim 2, wherein said function means includes means for providing a pseudo-random interchange of the functions each cycle.

4. An orthogonally modulated PPM array transmitter comprising:

an antenna array comprising N antenna elements coupled to N channels;

phase conjugate beam steering means comprising a common phase conjugate signal generator, and N phase conjugate amplifier units individual to said channels;

wherein the phase conjugate signal generator comprises an RF signal source, an IF signal source, a mixer with inputs from the RF and IF signal sources and an output to two filters, which are a sum filter tuned to the sum of the signals from the RF and IF signal sources, and a difference filter tuned to the difference of the signals from the RF and IF signal sources, outputs from the two filters being coupled to inputs of the N phase conjugate amplifier units;

wherein each phase conjugate amplifier unit comprises a first mixer with an input from said sum filter, a second mixer with an input from said difference filter, an IF amplifier having an input from the first mixer and an output to the second mixer, a circulator coupled to the antenna elements for the channel, with coupling from the circulator to an input of the first mixer, and coupling from an output of the second mixer to the circulator;

each of the N channels having phase shift means for providing a first phase shift in each channel;

function means coupled to the phase shift means of all N channels for controlling the first phase shift in each channel to selectively have a first or a second phase value which differ by 180°;

wherein said function means comprises a function generator which produces a given set of N two-valued functions in repetitive cycles, each cycle being divided into N equal intervals, the value of each function being fixed during each interval with one of two values, the character of the set of functions being such that during one interval of each cycle all the functions have the same value while in other intervals half the functions have one value and half the other value, with the interval in which the values are all equal being changed if some of the functions are inverted, and modulation means for selectively controlling which if any functions are inverted during each cycle to thereby selectively determine the interval during which the functions all have the same value, the value of said first phase shift in each channel being controlled during each interval in accordance with the value of one of the functions for the duration of a cycle as controlled by the modulation means.

5. Apparatus as set forth in claim 4, wherein said functions produced by said function means comprise N Walsh functions from wal (0,θ), sal (1,θ), cal (1,θ), sal (2,θ), to sal (N/2,θ).

6. Apparatus as set forth in claim 5, wherein said function means includes means for providing a pseudo-random interchange of the functions each cycle.

7. Apparatus as set forth in claim 4, wherein said function means includes means for providing a pseudo-random interchange of the functions each cycle.

* * * * *